D. MATER, Jr.

Improvement in Sawing-Machines.

No. 130,516.  Patented Aug. 13, 1872.

Witnesses:
Jas. O. Hutchinson
C. L. Evert

Inventor
Daniel Mater Jr.
per Alexander Mason
Attorneys.

UNITED STATES PATENT OFFICE.

DANIEL MATER, JR., OF BELLMORE, INDIANA.

IMPROVEMENT IN SAWING-MACHINES.

Specification forming part of Letters Patent No. 130,516, dated August 13, 1872.

*To all whom it may concern:*

Be it known that I, DANIEL MATER, Jr., of Bellmore, in the county of Parke and in the State of Indiana, have invented certain new and useful Improvements in Sawing-Machines; and do hereby declare that the following is a full, clear, and exact description thereof, reference being had to the accompanying drawing and to the letters of reference marked thereon making a part of this specification.

The nature of my invention consists in the construction and arrangement of a machine for sawing logs, as will be hereinafter more fully set forth.

In order to enable others skilled in the art to which my invention appertains to make and use the same, I will now proceed to describe its construction and operation, referring to the annexed drawing, in which—

Figure 1:
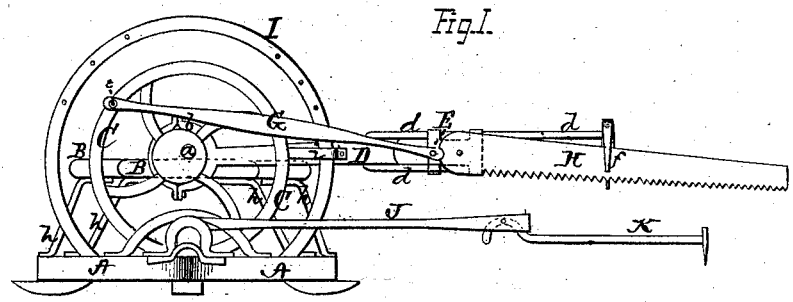
Figure 2:
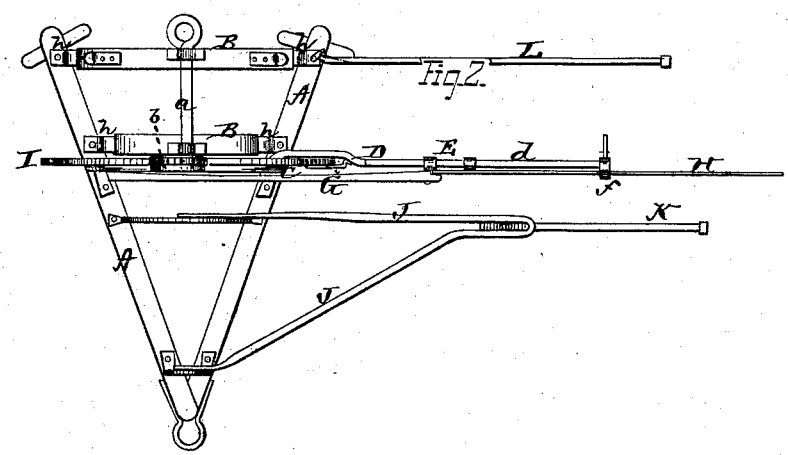
Figure 3:

Figure 1 is a side view, and Fig. 2 a plan view, of my sawing-machine. Fig. 3 represents an extension rod used with the same.

A A represent two bars, connected together at one end, forming a V, and upon their other ends are, by metal knees $h\ h$, supported two parallel bars, B B. Upon the bars B B is, in suitable boxes, placed the shaft $a$, having upon its inner end a fly-wheel, C. This wheel is arranged eccentrically on the end of the shaft $a$, or it may be put on true in the center. On the rear side of the wheel, around the hub, is an eccentric, $b$, to which the guide-bar D is fastened so as to give the saw a rocking motion, causing the saw to cut faster and clear the dust out of the log better than where the saw runs level. At the outer end of the guide-bar, running about half way back, are two rods, $d\ d$, some distance apart to admit a sliding box, E, between them, to which the pitman G and saw H are fastened. The other end of the pitman G is fastened to a wrist-pin, $e$, on the front of the fly-wheel. At the outer end of the guide-bar is a guide-spring, $f$, passing over the back of the saw H, keeping the same steady while sawing, and does not let the saw switch about. Around the fly-wheel is a circular bar, I, which holds the guide-bar steady by means of a staple or loop, $i$, attached to said guide-bar, and passing around the circular bar. This bar is also used for holding up the saw, when moving along the log, by raising the saw and placing a pin under the guide-bar in either of the holes in said circle, shown in Fig. 1. These parts are further so arranged that, by taking out two bolts, the saw may be turned over and used on the opposite side of the log; or if the saw is located between two logs the operator can saw both ways. On the front end of the frame is pivoted a forked brace, J, in the outer end of which is attached the dog K. This dog may be removed, turned over, and fastened again, to be used on the other side. To the end of one of the bars B is attached or hooked another dog, L, which is to be used in sawing heavy timber, or in doing very fast sawing. The front dog K is to be used at all times for holding the log. R represents the double-bar tumbling-rod, formed of two half-round bars placed with their flat sides against each other, and having a collar, $m$, at the inner end of each bar, through which the other bar slides. There is also a collar, $n$, in the center, sliding on the two bars to hold them together. This tumbling-rod is hooked into the end of the shaft $a$, and will extend as the jack or saw frame is moved forward.

Having thus fully described my invention, what I claim as new, and desire to secure by Letters Patent, is—

1. The combination of the guide-bar D, rods $d\ d$, sliding head E, spring $f$, saw H, pitman G, and fly-wheel C with eccentric $b$, all substantially as and for the purposes herein set forth.

2. The circle I, arranged around the fly-wheel C, in combination with the guide-bar D and loop $i$, substantially as and for the purposes herein set forth.

3. The saw-frame, composed of the bars A A arranged in V form, with the parallel bars B B supported upon metal knees $h\ h$, substantially as herein set forth.

In testimony that I claim the foregoing I have hereunto set my hand this 6th day of May, 1872.

DANIEL MATER, JR.

Witnesses:
JAMES W. BRECKENRIDGE,
G. J. COLLINGS.